United States Patent [19]
Nakamura et al.

[11] Patent Number: 4,580,181
[45] Date of Patent: Apr. 1, 1986

[54] COMPACT CASSETTE PLAYER

[75] Inventors: Yuji Nakamura, Hirakata; Hidemi Sasaki, Neyagawa, both of Japan

[73] Assignee: Matsushita Electric Industrial Co., Ltd., Kadoma, Japan

[21] Appl. No.: 442,439

[22] Filed: Nov. 17, 1982

[30] Foreign Application Priority Data

Nov. 18, 1981 [JP] Japan .................................. 56-185022
Apr. 20, 1982 [JP] Japan .................................... 57-66703

[51] Int. Cl.⁴ ............................................. G11B 15/00
[52] U.S. Cl. ...................................... 360/93; 360/96.1; 242/197
[58] Field of Search .................. 360/93, 96.1, 96.5; 242/197; 200/5 R, 5 A, 6 A, 159 R, 61.5 A

[56] References Cited
U.S. PATENT DOCUMENTS 1,619,010  3/1927  Wilhelm ........................ 200/159 A
3,005,055 10/1961  Mattke ............................ 200/11 K
4,029,915  6/1977  Ojima ............................. 200/6 A X Primary Examiner—John H. Wolff
Attorney, Agent, or Firm—Wenderoth, Lind & Ponack

[57] ABSTRACT

A cassette tape recording and/or reproducing apparatus have a cassette holder including a cassette chamber and a cover plate for selectively opening and closing the cassette chamber. A pair of spindles for the support thereon of the reel hubs within the cassette have respective signal transmitting elements axially extending therethrough for transmitting to an associated switch a signal indicating that a corresponding one of the function control buttons has been manipulated. Each of these signal transmitting elements may be either an axially movable motion transmitting rod or a rod-shaped electric conductor. The corresponding function control buttons at least one for each spindle are provided on the cover plate at such positions as they align with the spindles when the cover plate is in the closed position.

6 Claims, 8 Drawing Figures

COMPACT CASSETTE PLAYER

BACKGROUND OF THE INVENTION

The present invention generally relates to a magnetic tape recording and/or reproducing apparatus and, more particularly, to a compact magnetic tape recording and/or reproducing apparatus of a type utilizing a cassette tape.

Various types of magnetic tape recording and/or reproducing apparatuses (which apparatuses are herein referred to as "cassette tape players") are currently commercially available. These include, for example, cassette tape decks for high fidelity recording and/or reproduction of sound information, combined radio receiver and tape recorders, portable tape recorders and others. While the tape players available nowaday are many in type, it is a recent trend, and so is very popular, to use a portable tape player in the enjoyment of listening to stereophonic sound information with the use of a pair of head-phones.

The portable tape player suited for use in the above described manner is, although not exclusively limited thereto, the type which utilizes a cassette tape. The player utilizing the cassette tape, i.e., cassette tape player, is currently manufactured compact in size without the slightest reduction in capability of recording and/or reproducing sound information in high fidelity.

The prior art compact cassette tape player is generally composed of three major components, a holder unit for accommodating a cassette tape, an internal mechanism including electric circuits, and an operating mechanism including manipulatable switching and control buttons. As the compact cassette tape player under production nowadays becomes smaller and smaller to a size approximating to the size of the tape cassette, so is each of the manipulatable function buttons to a size too small to be touched by the user's or operator's finger without the neighboring button or buttons being inadvertently manipulated. Thus, the prior art compact cassette tape player has a disadvantage in handling convenience.

When it comes to another type of prior art compact cassette tape player wherein the manipulatable function buttons are arranged on one side face of the player or on one surface of the player opposite to and remote from the cassette holder, disadvantages have been found in that both the manipulatable function buttons and the tape cassette loaded in the cassette holder cannot be viewed simultaneously thereby rendering it difficult or inconvenient to manipulate some of the function buttons while the user or operator watches the movement of the magnetic tape from one reel to another within the tape cassette, and in that since some or all of the function buttons protrude outwards a substantial distance from such one side face or such one surface of the player, they tend to provide an obstacle to the smooth insertion of the player into a pocket, bag or flexible case.

In addition, in both types of the prior art compact cassette tape player, a relatively large space is required to accommodate the operating mechanism, thereby hampering the design and manufacture of more compact cassette tape players, and therefore, the compact cassette tape player remains relatively bulky even though minimized in size according to the state of art.

SUMMARY OF THE INVENTION

Accordingly, the present invention has been developed with a view to substantially eliminating the above described disadvantages and inconveniences inherent in the prior art portable cassette tape player and has for its essential object to provide a novel cassette tape player which can be manufactured, with no unreasonable increase of the manufacturing cost, to a size approximating to the size of the tape cassette which it utilizes.

Another object of the present invention is to provide a novel cassette player of the type referred to above, wherein both the manipulatable function buttons and the tape cassette loaded in the holder can be simultaneously viewed from one direction and which, therefore, is effective to obviate any possible erroneous manipulation of one or some of the function buttons which would occur when the user or operator casts his or her observant eyes to the cassette tape inside the player.

A still further object of the present invention is to provide a novel cassette tape player of the type referred to above, which is easy to handle and which can have a sophisticated appearance that might attract potential customers.

In order to accomplish these objects, the present invention provides the novel cassette tape player wherein at least one of the spindles for the support of the respective reel hubs, rotatably housed within a generally rectangular tape cassette in spaced relation to each other, is utilized to accommodate signal transmitting elements operatively coupled to the manipulatable function buttons. According to one preferred embodiment of the present invention, these manipulatable function buttons are operatively carried by an at least partially transparent or semi-transparent, hingedly supported cover, forming a part of the cassette holder together with a cassette chamber in the player body, generally in alignment with the associated center bores in the respective reel hubs. Thus, the cassette tape player according to the present invention is so designed that, when and after the cover is moved to a closed position to close the access opening leading to the cassette chamber with the tape cassette loaded therein, the manipulatable function buttons are held in position ready to transmit their movement to internal electric switches or any other internal actuating mechanisms through the associated signal transmitting elements.

According to the present invention, any commercially available cassette tapes can be utilized without the slightest modification required and in the same way as they are used in the conventional cassette tape players. However, in the present invention, it is essential that at least one of the player spindles for the support thereon of the reel hubs when the tape cassette is loaded in the cassette chamber must be hollow in its axial direction completely through the entire length thereof. However, when it comes to the utilization of the currently standardised tape cassette, the maximum available diameter of the axial hollow in the spindle appears to be limited and so does the number of the signal transmitting elements to extend through such axial hollow. On the other hand the number of the manipulatable function buttons currently used in the conventional player of a similar kind is about five or more, and therefore, it is preferred that both of the spindles be made hollow on the one hand and, on the other hand, the function buttons requiring the signal transmitting elements one for each of them are grouped into two aggregations one for each spindle.

BRIEF DESCRIPTION OF THE DRAWINGS

These and other objects and features of the present invention will become readily understood from the following detailed description taken in conjunction with preferred embodiment of the present invention with reference to the accompanying drawings, in which.

DETAILED DESCRIPTION OF THE EMBODIMENTS

Figure 1:
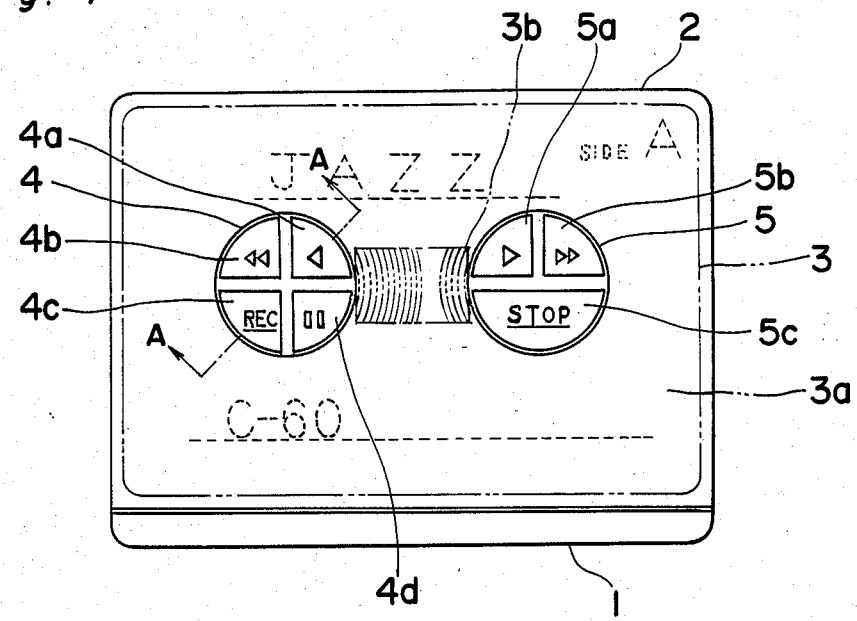
FIG. 1 is a top plan view of a cassette tape player according to one preferred embodiment of the present invention.

Before the detailed description of the present invention proceeds, it is to be noted that like parts are designated by like reference numerals throughout the accompanying drawings.

Figure 2:
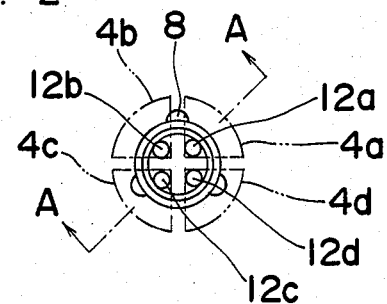
FIG. 2 is a top plan view of one of the two spindles for the support thereon of the reel hubs in a tape cassette.
Figure 3:
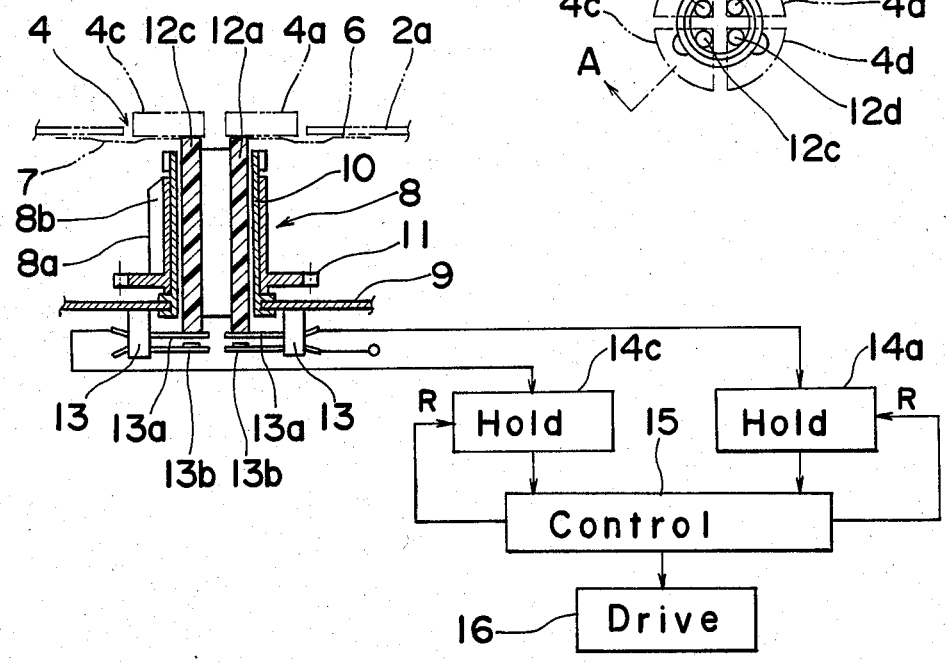
FIG. 3 is a cross-sectional view, on an enlarged scale, taken along the line A—A in FIG. 2, showing one of the operating mechanisms together with an electric circuit.

Referring first to FIGS. 1 to 3, a magnetic tape recording and reproducing apparatus, or briefly speaking, a cassette tape player 1 has a cassette holder 2 comprised of a generally rectangular transparent cover plate 2a hingedly supported for selectively opening and closing a cassette chamber defined by a bottom panel and a surrounding wall. So far shown in FIG. 1, a tape cassette 3 of any commercially available type containing a length of magnetic tape 3b having its opposite ends secured to and turned around the respective reel hubs (not shown) as is well known is accommodated within the cassette chamber while the cover plate 2a is in a closed position. In this condition, one of the labels 3a applied on the opposite surfaces of the cassette 3, respectively, which faces the cover plate 2a is viewable through the transparent cover plate 2a together with the magnetic tape 3b stored within the cassette 3.

The cover plate 2a has two circular apertures 4 and 5 so defined therein and so spaced as to align with respective spindles for the support thereon of the reel hubs, as will be described later, when the cover plate 2a is in the closed position. Two groups of manipulatable function buttons are respectively accommodated in the apertures 4 and 5 in a manner which will now be described.

The first group of the function buttons includes, a "Play" button 4a, a "Fast Winding" button 4b, a "Recording" button 4c and a "Pause" button 4d whereas the second group of the function buttons include a "Play" button 5a, a "Fast Winding" button 5b and a "Stop" button 5c. While these buttons 4a and 4d and 5a to 5c are to be understood responsible for performing the following summarized jobs, the "Play" and "Fast Winding" buttons 4a and 4d in the first group and the "Play" and "Fast Winding" buttons 5a and 5b in the second group functionally differ from each other in that the buttons 4a and 4b are associated with the transportation of the tape 3b in one direction, for example, a leftward direction as viewed in FIG. 1 whereas the buttons 5a and 5b are associated with that in the opposite direction, i.e., a rightward direction. (In view of this, the cassette tape player herein referred to for the purpose of the present invention so far shown in FIG. 1 may be considered a type wherein the tape cassette, after the completion of run of the tape in either one of the leftward and rightward directions, need not be turned upside down to enable the run of the tape in the other of the leftward and rightward directions. This type is also well known to those skilled in the art.) "Play" button 4a or 5a:

When this button is depressed by the application of an external finger pressure, the associated spindle is coupled to a drive system to transport the length of magnetic tape 3b from one reel hub to another along a predetermined tape path in the predetermined direction at a normal operating speed.

"Fast Winding" button 4b or 5b:

When this button is depressed, the length of magnetic tape 3b can be transported from one reel hub to another at a higher speed than that when the "Play" button 4a or 5a is depressed, for cuing or quick winding purpose.

"Recording" button 4c:

This button is utilized when the player is desired to operate under a recording mode during which information can be recorded on the magnetic tape 3b being transported from one reel hub to another.

"Pause" button 4d:

This button is utilized when the transportation of the magnetic tape 3b being moved is temporarily interrupted while the player is operating under either one of the recording and reproducing modes.

"Stop" button 5c:

This button is utilized to cancel the operation of the player which has been initiated by manipulating one of the various buttons 4a to 4d, 5a and 5b.

The first group of the buttons 4a to 4d are each guadrant-shaped so that, when they are properly arranged, they can represent a generally circular shape as a whole to enable them to be accommodated in the aperture 4. A similar description applies to the second group of the buttons, it being, however, noted that, since the number of the buttons in the second group so far shown and described is three, only the button 5c has a semi-circular shape while the buttons 5a and 5b have a shape similar to that of any one of the buttons 4a to 4d.

Since the buttons 4a to 4d of the first group and the button 5a and 5c of the second group are supported on the cover plate 2a in the respective apertures 4 and 5 in the same way and are operatively associated, also in the same way with respective switches for controlling related operating mechanisms of the cassette tape player 1, reference will now be made to the first group of the buttons 4a and 4d, particularly the buttons 4a and 4c, for the sake of brevity.

Referring particularly to FIG. 3, the buttons 4a and 4c are rigidly mounted on leaf springs 6 and 7 secured at one end to the respective buttons 4a and 4c and at the other end secured to the undersurface of the cover plate 2a. Each of the buttons 4a and 4c may have a thickness either equal to or smaller than, or slightly greater than the thickness of the cover plate 2a, provided that the top of the respective button 4a or 4c can be held generally flush with the top surface of the cover plate 2a when and so long as such button 4a or 4c has not yet been depressed by the application of an external finger pressure.

While the cassette tape player in general has two spaced spindles protruding into the cassette chamber for the support thereon the associated reel hubs in the tape cassette 3 when the latter is loaded into the cassette chamber, the spindle which comes into alignment with the first group of the buttons 4a to 4d is generally identified by 8 in FIGS. 2 and 3. As shown, the spindle 8 comprises a cylindrical hollow body 8a having, as is well known, a plurality of equally spaced, axially extending drive spokes 8b engageable with teeth of the reel hub to permit motion of, or impart motor to, the reel hub, and an external gear wheel 11 radially outwardly extending from a lower end thereof. The spindle 8 is rotatably mounted on a rigid support sleeve 10 extending completely through the hollow in the spindle 8 and secured at its lower end to a support base 9 below a bottom panel (not shown) defining the bottom of the cassette chamber and held in face-to-face relation to the cover plate 2a in the closed position. The support base 9 carries a plurality of electrical switches positioned on one side of the support base 9 opposite to the cassette chamber, only two of which switches associated with the buttons 4a and 4c are shown by 13 in FIG. 3. So far shown, each of the switches 13 is of a type comprising a pair of spaced contact elements, each in the form of a leaf spring, protruding from and generally in parallel to the support base 9 so as to terminate at a position in alignment with the hollow in the support sleeve 10 and immediately below the respective button 4a, 4b, 4c or 4d.

Extending completely through the hollow in the support sleeve 10 are signal transmitting elements equal in number of the buttons 4a, 4b, 4c and 4d and movable axially of the support sleeve 10. These signal transmitting elements each operable to transmit to the associated switch 13 a signal indicative of the depression or downward displacement of the respective button are in the form of motion transmitting rods 12a, 12b, 12c and 12d in the embodiment now under discussion. Each of these motion transmitting rods 12a to 12d has a lower end resting on the contact element 13a of the associated switch 13 and an upper end held in contact with the under surface of the associated button 4a, 4b, 4c or 4d, it being, however, understood that the contact element 13a of the respective switch 13 has a resiliency sufficient to support the weight of the associated signal transmitting rod without being moved thereby to contact the mating contact element 13b unless the associated button 4a, 4b, 4c or 4d is depressed. Specifically, each of the signal transmitting rods 12a to 12d has such a length and is so housed in the support sleeve 10 that, only when the respective button 4a, 4b, 4c or 4d is depressed against the associated leaf spring 6 or 7 by the application of the external finger pressure, the displacement of such button 4a, 4b, 4c or 4d so effected can be transmitted to the associated switch 13 through such rod 12a, 12b, 12c or 12d, causing the contact element 13a to engage the mating contact element 13b to complete the electric circuit across such associated switch 13. Return of the rod 12a, 12b, 12c or 12d to an upwardly shifted position as viewed in FIG. 3 takes place by the effect of the resiliency of the contact element 13a when and after the applied finger pressure is removed from the associated button 4a, 4b, 4c or 4d.

Although not shown, these rods 12a to 12d are to be understood as supported only for axial movement in any suitable manner so that they will not undergo any angular motion about the longitudinal axis of the support sleeve 10.

The switches 13 are in turn electrically connected to respective hold circuits each operable to memorize the condition in which the respective switch 13 has once been closed even though the associated contact element 13a once engaged to the mating contact element 13b is separated therefrom as a result of the removal of the finger pressure and to continue generating its output signal up until a reset signal is applied thereto incident to the subsequent manipulation or depression of another one of the buttons 4a to 4d. It is to be noted that only two of the hold circuits associated with the buttons 4a and 4c are shown by 14a and 14c in FIG. 3, respectively. All of the hold circuits are in turn connected through a control circuit 15 to a drive circuit 16 so that the latter can be controlled by the control circuit 15 in response to the output signal from any one of the hold circuits.

By way of example, when the button 4c, i.e., the "Recording" button 4c is depressed after the tape cassette 3 has been loaded in the cassette chamber with the cover plate 2a held in the closed position, the consequent downward displacement of the associated rod 12c is transmitted to the relevant switch 13 to cause the latter to close. While the removal of the external finger pressure applied to the button 4c results in the opening of such relevant switch 13, a pulse signal generated from the relevant switch 13 at the time of closure thereof is supplied to the associated hold circuit 14c which continues generating its output signal up until the reset signal is applied thereto. In response to the output signal from the hold circuit 14c, the control circuit 15 feeds through the drive circuit 16 a motor to drive both a capstan (not shown) and one of the spindles having its geared wheel 11 then coupled to the motor through a suitable transmission system (not shown), to advance a head carrier plate to bring a magnetic recording and/or reproducing head into contact with the magnetic tape 3b, and to cause the player to operate in the recording mode.

According to the embodiment shown in and described with reference to FIGS. 1 to 3, all of the function buttons hitherto provided in the player separate and distant from the cassette holder unit can be integrated generally within the spindles existing inside the cassette chamber of the cassette tape player. In addition, as can readily be seen from FIG. 1, since the "Play" and "Fast Winding" button 4a and 4b associated with the transportation of the magnetic tape from one reel hub to another in the leftward direction and the "Play" and "Fast Winding" buttons 5a and 5b associated with that in the rightward direction are located on the right-hand and left-hand sides, respectively, as viewed in FIG. 1, the operator or user of the cassette tape player according to the present invention is given ready access to one of the buttons he or she has intended to manipulate, with no possibility of the incorrect button being manipulated as to the direction in which the cassette tape is desired to be transported. Moreover, it is clear that both the buttons of both groups and the reeled magnetic tape can simultaneously be viewed.

It is to be noted that, in order to avoid any possibility that one or all of the buttons of each group may interrupt the sight of the operator or user directed to the label 3a on the tape cassette 3, it is preferred to select the circle occupied by each group of the buttons so as to have a maximum diameter equal to or smaller than the outer diameter of the corresponding reel hub in the tape cassette 3.

In the foregoing embodiment shown in and described with reference to FIGS. 1 to 3, each of the switches 13 has been comprised of the resilient contact elements 13a and 13b, the contact element 13a adapted to be engaged against its own resiliency with the contact element 13b when the associated rod 12a, 12b, 12c and 12d has been downwardly displaced as a result of the depression of the associated button, while the leaf spring is employed separate from the contact element 13a or 13b for permitting the respective button to return to the original position once the external finger pressure is removed therefrom. However, in the embodiment to be subsequently described with reference to FIG. 4, the resiliency of one of the contact elements of each switch 13 is utilized to permit the respective button to return to the initial position upon the removal of the finger pressure therefrom.

Figure 4:
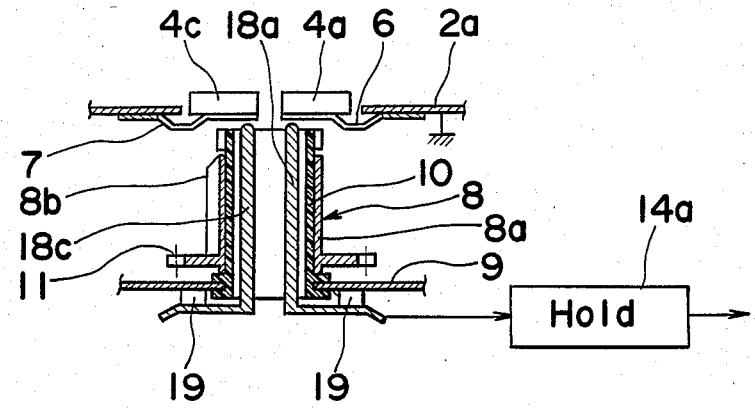
FIG. 4 is a view similar to FIG. 3, showing another preferred embodiment of the present invention.

Referring now to FIG. 4, the signal transmitting elements which have been described as comprised of the motion transmitting rods in the foregoing embodiment are comprised of a rod-shaped electric conductor, only two of which are shown by 18a and 18c as associated with the buttons 4a and 4c. Each of these conductors 18a or 18c has a lower end connected rigidly with, or otherwise formed integrally with a tongue which is electrically connected to the associated hold circuit (only the hold circuit 14a being shown) on the one hand and is mechanically connected through an insulative spacer 19 to the undersurface of the support base 9 with the respective conductor extending axially through the support sleeve 10.

On the other hand, the leaf springs (only the leaf springs 6 and 7 being shown as associated with the buttons 4a and 4c) used to support the respective buttons in the respective aperture 4 or 5 are used as contact elements cooperable with the rod-shaped conductors and are, therefore, electrically grounded.

Each of the rod-shaped conductors 12a to 12d has such a length that, when the cassette tape player is not in use, the rod-shaped conductor having a lower end secured to the support base 9 through the corresponding tongue 19 can have its upper end terminating at a position spaced a predetermined distance from the respective leaf spring supporting the associated button from below. In this construction, it is clear that, when one of the buttons, for example, the button 4a is depressed against the corresponding leaf spring 6 by the application of the external finger pressure, the leaf spring 6 contacts the upper end of the associated rod-shaped conductor 18a to complete an electric circuit therebetween. Therefore, the switch composed of the leaf spring 6 and the rod-shaped conductor 18a generates an electric signal which is then fed to the hold circuit 14a described hereinbefore with reference to FIG. 3. Thus, even the embodiment shown in and described with reference to FIG. 4 functions in a similar manner as that shown in and described with reference to FIGS. 1 to 3.

The cassette tape player according to the embodiment shown in FIG. 4 brings about an additional advantage in that the number of movable parts used can be minimized. This is especially true where the user's finger is used as a circuit control element necessary to connect the rod-shaped conductors to the ground one at a time.

It is, however, noted that, in the embodiment shown in FIG. 4, the support sleeve 10 must be made of an electrically insulating material or must have an electrically insulative lining applied on the inner peripheral surface thereof, while the rod-shaped conductors extending inside the hollow of the support sleeve must be electrically insulated from each other. The electrical insulation of the rod-shaped conductors can be achieved in numerous ways, for example, by applying an insulative lining to the periphery of each conductor, by the use of insulative sheets inserted into the hollow of the support sleeve 10 to isolate the conductors from each other, or causing the support sleeve 10 to have a plurality of hollows instead of the single hollow.

In any one of the foregoing embodiments shown in FIGS. 1 to 3 and FIG. 4, respectively, each spindle 8 in the cassette chamber has been described and shown as having a plurality of signal transmitting elements. However, considering the novel concept of the present invention, the number of the signal transmitting elements used for each spindle 8 may not always limited thereto, but may be one. In the embodiment to be subsequently described with reference to FIGS. 5 to 8, not only is only one signal transmitting element employed for each spindle, but a modification is also effected to the mounting of each spindle 8 on the corresponding support sleeve 10 for enabling the geared wheel 11 to be engaged with a drive wheel substantially simultaneously with the depression of the corresponding button on the cover plate.

Figure 5:
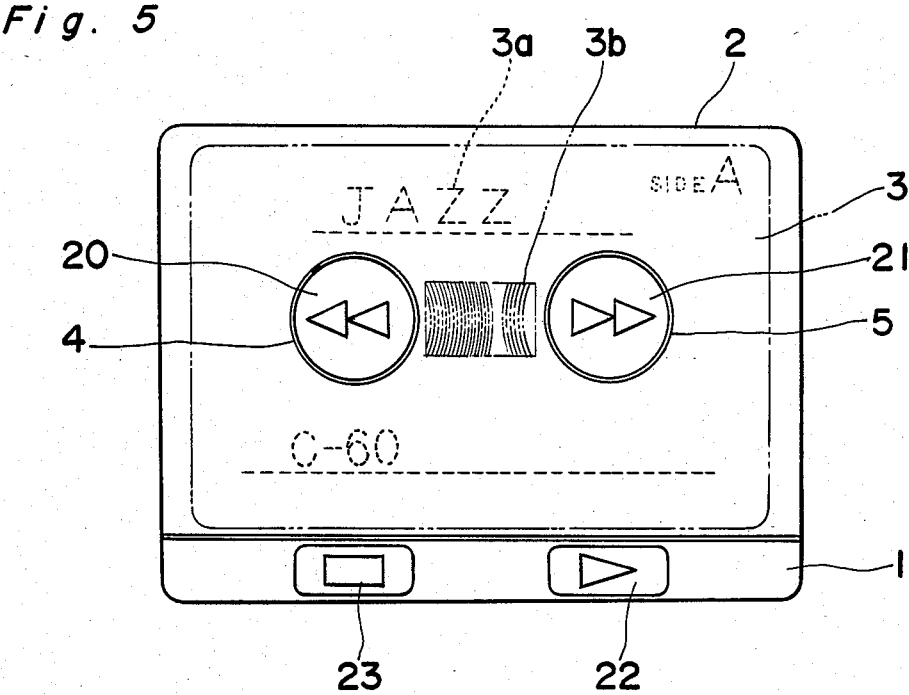
FIG. 5 is a top plan view of the cassette tape player according to a further preferred embodiment of the present invention.
Figure 6:
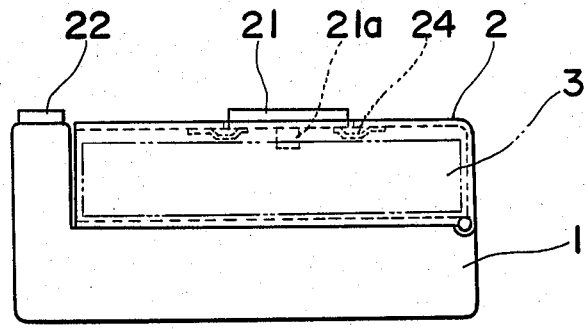
FIG. 6 is a lateral side view of the player shown in FIG. 5.

Referring now to FIGS. 5 to 8, particularly to FIGS. 5 and 6, the cover plate 2a has two of the necessary function buttons, for example, the "Fast Winding" buttons 20 and 21 associated respectively with the leftward and rightward transportation of the magnetic tape. These "Fast Winding" buttons 20 and 21 are supported in the apertures 4 and 5 by means of respective leaf springs, only one of which is shown by 24 in FIG. 6 for the button 20. Each of the leaf springs 24 is preferably of a construction consisting of an annular ring having at least two or more resilient tongues extending radially inwardly from the annular ring, and is carried by the cover plate 2a with the annular ring secured to the undersurface of the cover plate 2a in coaxial relation to the associated aperture 4 and 5, while the associated button 20 or 21 is rigidly mounted on the resilient tongues.

As shown in FIG. 6, the other function buttons such as "Play" and "Stop" buttons 22 and 23 are disposed on a portion of the cassette tape player 1 separate from and laterally of the cassette holder 2 and arranged generally in a row along the longitudinal sense of the player 1.

The function buttons 20 and 21 on the cover plate 2a have respective pedestals 20a and 21a integral therewith and protruding therefrom towards the cassette chamber in alignment with the associated spindles 8, the function of each of which will be described later.

Figure 7:
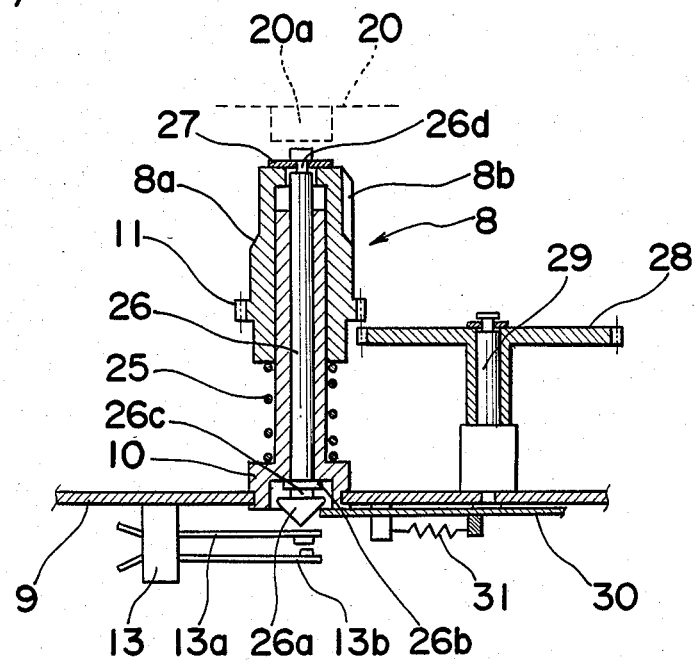
FIGS. 7 and 8 are views each similar to FIG. 3, showing the operating mechanism in the player of FIGS. 5 and 6 in different operative positions, respectively.
Figure 8:
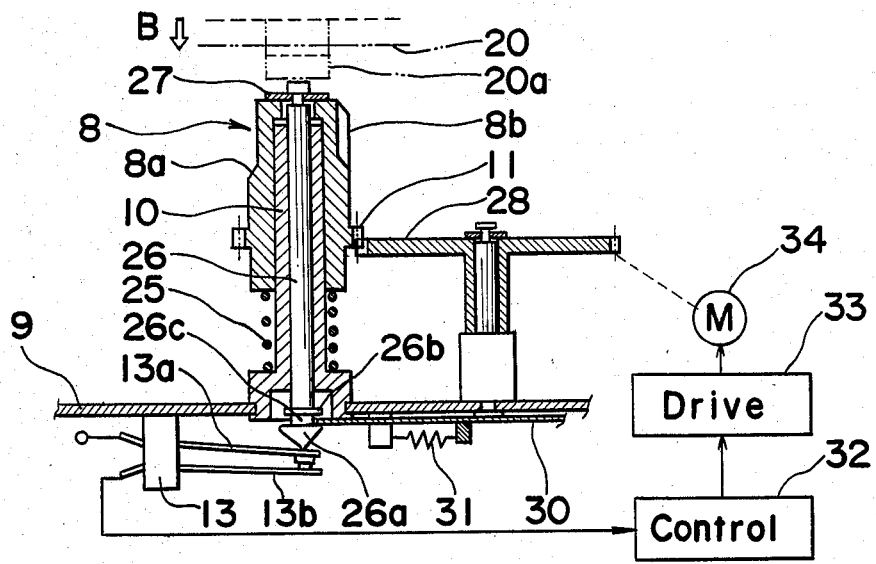

Referring now to FIGS. 7 and 8, since the spindles 8 are of identical construction, reference will be made only to the spindle associated with the function button 20. The spindle 8 is mounted on the support sleeve 10 for axial sliding movement between downwardly and upwardly shifted positions, shown respectively in FIGS. 8 and 7, and is normally biased to the upwardly shifted position by a biasing spring 25. As a signal transmitting element, a motion transmitting rod 26 has one end formed into a downwardly tapering cone 26a and also formed with a collar 26b of a diameter greater than the inner diameter of the support sleeve 10, a portion of said rod 26 between the cone 26a and the collar 26b being formed into a neck area 26c of a diameter smaller than that of the collar 26c and also smaller than the maximum diameter of the cone 26a.

The motion transmitting rod 26 is slidably inserted through the hollow in the support sleeve 10 with the collar 26b abutting the lower end of the support sleeve 10 and the other end positioned exteriorly of the upper end of the spindle 8. For avoiding the separation of the spindle 8 from the support sleeve and also for defining the upwardly shifted position for the spindle 8, the other end of the rod 26 positioned exteriorly of the upper end of the spindle 8 has a split washer 27 engaged in a groove 27d on the rod 26.

The contact elements 13a and 13b forming the switch 13 are disposed immediately below the cone 26a such that, when the rod 26 is downwardly shifted together with the spindle 8 against the spring 25, the contact element 13a can be moved to contact the mating contact element 13b thereby to close the switch 13. It is to be noted that, when and so long as the spindle 8 is held in the upwardly shifted position as shown in FIG. 7, the geared wheel 11 integral with the spindle 8 is disengaged from a drive gear 28 rotatably mounted on the support base 9 through a shaft 29. It is when the spindle 8 is axially moved from the upwardly shifted position to the downwardly shifted position against the spring 25 that the geared wheel 11 can be brought into engagement with the drive gear 28 as shown in FIG. 8. Naturally, the movement of the spindle 8 towards the downwardly shifted position can be effected when the finger pressure is applied to the respective button 20 to cause the pedestal 20a to push the rod 26 downwards and, hence, the spindle 8.

The electric circuit including the switch 13 may be the one shown in FIG. 3, but so far shown in FIG. 8, the electric circuit is of a type wherein a particular operating mechanism of the player is operated or controlled only when and so long as the switch is closed. Accordingly, in order to retain the rod 26 in a downwardly shifted position with the switch 13 closed once it has been moved thereto together with the spindle 8 by the application of the external push on the button 20, there is employed a retainer plate 30 movably supported by the support base 9 for movement in a direction close to and away from the rod 26. This retainer plate 30 is normally biased leftwards, as viewed in FIGS. 7 and 8 by a spring 31 with its one end engaged to the cone 26a when and so long as the rod 26 has not yet been displaced downwards. However, as the rod 26 is downwardly displaced together with the spindle 8 against the spring 25 as a result of the finger push applied to the button 20, the one end of the retainer plate 30 slides along the conical face of the cone 26a and is subsequently engaged into the neck area 26c by the action of the spring 31 thereby holding the rod 26 and, hence, the spindle 8 in the downwardly shifted position shown in FIG. 8. When the condition shown in FIG. 8 is established, not only can the geared wheel 11 be engaged with the drive gear 28, but also the switch 13 is held in the closed position, to activate a control circuit 32, and therefore a signal handling circuit (not shown) can be brought into a required state in response to an output signal from the control circuit 32 on the one hand and the output signal from the control circuit 32 is used to drive a motor 34 through a drive circuit 33 thereby to drive the spindle 8 through the drive gear 28 and then the geared wheel 11. Thus, the fast winding of the magnetic tape in the leftward direction takes place.

The release of the rod 26 from the downwardly shifted position, that is, the disengagement of the retainer plate 30 from the neck area 26c to allow the return of the rod 26 to an upwardly shifted position together with the spindle 8, can be effected by depressing, for example, the "Stop" button 23 to cause the retainer plate 30 to be electrically or mechanically moved against the spring 31 in a direction away from the cone 26b.

Although according to the embodiment shown in and described with reference to FIGS. 5 to 8, the cassette tape player appears to be somewhat larger in size than that according to any one of the foregoing embodiments because of the provision of the function buttons 22 and 23, it can exhibit similar advantages and effects to those described in connection with the foregoing embodiments.

From the foregoing description of the present invention, it has now become clear that, because the spindles for the support thereon the respective reel hubs in the tape cassette are ingeniously utilized to accommodate signal transmitting elements with some of the necessary function buttons consequently shifted in position to the cover plate for the selective opening and closure of the cassette chamber, the cassette tape player can advantageously be manufactured in a compact size and in a sophisticated appearance. Moreover, the provision of the function buttons on the cover plate of the cassette holder makes it clear that the user can look at both the label on the cassette with in the cassette holder and the positions of the function buttons simultaneously, and therefore, the cassette tape player according to the present invention is easy to handle.

Although the present invention has fully been described in connection with the preferred embodiments thereof with reference to the accompanying drawings, it should be noted that various changes and modifications will be apparent to those skilled in the art. For example, so far as the embodiments shown respectively in FIGS. 1 to 3 and FIGS. 5 to 8 are concerned, the switch 13 although it has been described as comprised of the contact elements 13a and 13b, may be in the form of a push-button switch.

Accordingly, such changes and modifications are to be understood as included within the scope of the present invention unless they depart therefrom.

What is claimed is:

1. A magnetic tape recording and/or reproducing apparatus of a type utilizing a cassette containing a length of magnetic tape secured at its opposite ends to respective reel hubs, said apparatus including a cassette chamber, a cover plate for selectively opening and closing the cassette chamber, a pair of spaced spindle means for supporting thereon the reel hubs when the cassette is loaded in the cassette chamber, a number of operating mechanisms capable of performing different functions, and at least one drive means for selectively driving the spindle means one at a time to effect the winding of the magnetic tape from one of the reel hubs to the other when and so long as at least one of the operating mechanisms is in operation, a switch means for controlling said one operating mechanism, and manipulatable function control elements for activating the switch means, the improvement wherein said switch means include at least two switches and there is employed at least one signal transmitting element for each spindle means, said signal transmitting element extending generally through the corresponding spindle means and operable to transmit a command therethrough to the corresponding switch when a corresponding one of the function control elements is manipulated.

2. An apparatus as claimed in claim 1, wherein each of said signal transmitting elements comprises a motion transmitting rod slidably extending through the corresponding spindle means, said motion transmitting rod, when displaced in one direction axially of the spindle means as a result of the manipulation of the corresponding function control element, actuating the respective switch.

3. An apparatus as claimed in claim 2, wherein said corresponding function control element is a function button elastically displaceably carried by the cover plate, said function button when the cover plate is in position to close the cassette chamber, aligning with the rod and adapted to push the rod axially of the spindle means to actuate the respective switch when a finger pressure is applied to said function button.

4. An apparatus as claimed in claim 1, wherein each of said signal transmitting elements comprises a rod-shaped electric conductor forming a first contact element of the respective switch, said first contact element being electrically connected with a second contact element through the respective conductor when the corresponding function control element is manipulated.

5. An apparatus as claimed in claim 4, wherein said corresponding function control element is a function button elastically displaceably carried by the cover plate, said function button when the cover plate is in position to close the cassette chamber, aligning with the conductor and carrying said first contact element, said first contact element being electrically connected to said second contact element through the conductor to close the switch when a finger pressure is applied to said function button.

6. An apparatus as claimed in claim 1 further comprising means for retaining the rod at a position to which it is moved.

* * * * *